March 23, 1937. H. E. DRENNAN 2,074,644
PROCESS OF EXTRACTING AND RECOVERING VOLATILE HYDROCARBONS FROM GASES
Filed Oct. 11, 1935
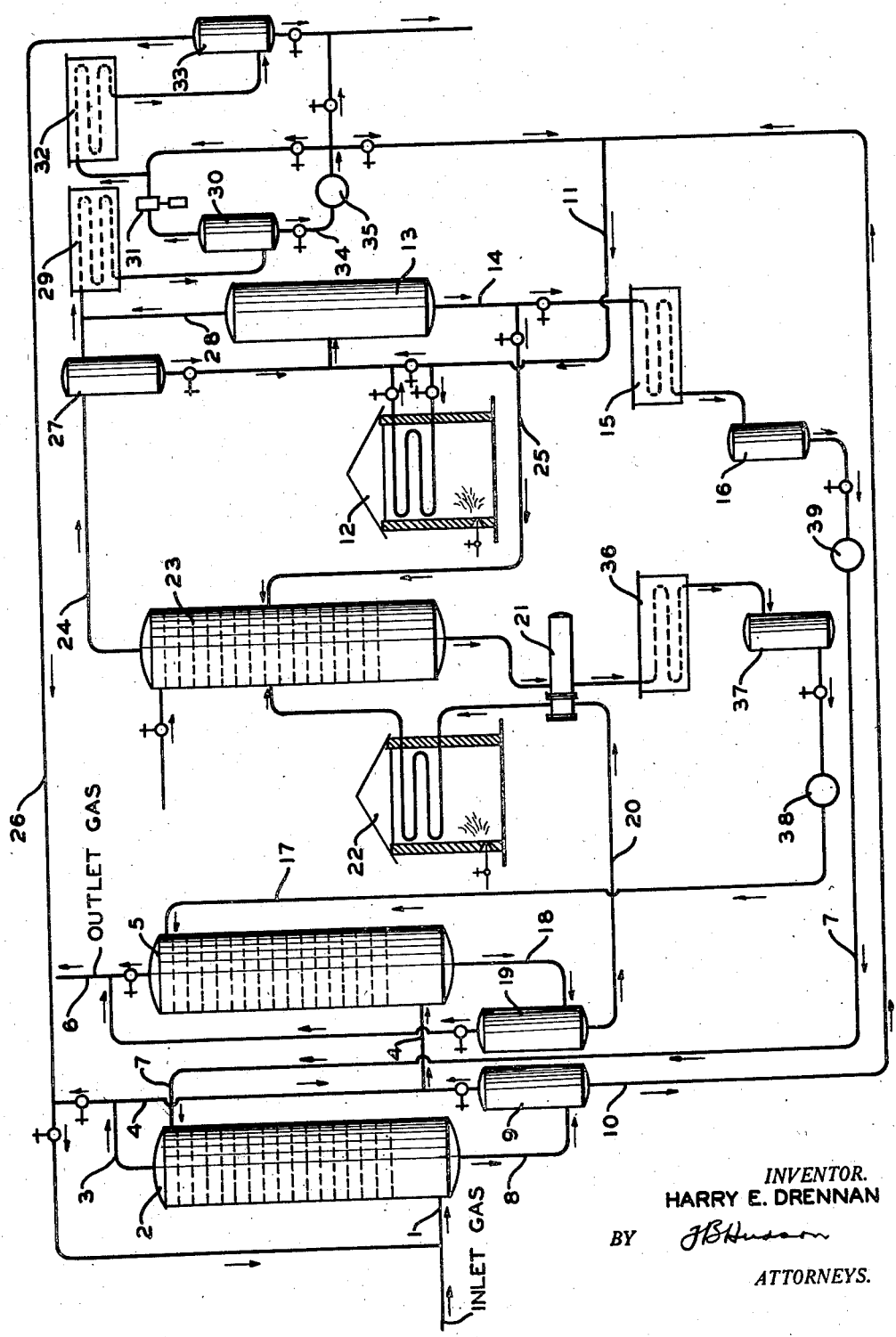
INVENTOR.
HARRY E. DRENNAN
BY *JBHudson*
ATTORNEYS.

Patented Mar. 23, 1937

2,074,644

UNITED STATES PATENT OFFICE 2,074,644

PROCESS OF EXTRACTING AND RECOVERING VOLATILE HYDROCARBONS FROM GASES

Harry E. Drennan, Whittenburg, Tex., assignor to Phillips Petroleum Company, a corporation of Delaware Application October 11, 1935, Serial No. 44,610

5 Claims. (Cl. 183—114)

This invention relates to improvements in methods for recovering volatile hydrocarbons, such as butane, propane, propylene and the like, from gases containing these hydrocarbons, by absorption processes, and this application is a continuation-in-part of my co-pending application Serial No. 744,081, filed September 14, 1934.

The conventional oil absorption method of extracting gasoline from natural gas consists in bringing the gas or petroleum vapors into intimate contact with a liquid absorbent, generally a distillate or gas oil, at as low a temperature as is economically possible, and at a pressure ranging from a few to several hundred pounds per square inch.

The three most important factors affecting absorption are pressure, temperature and oil rate, or oil to gas ratio. The absorbers are generally operated at some pressure below one hundred pounds, usually about fifty pounds. The absorption temperature is usually about atmospheric. The oil rate is the factor which is easiest to vary, and the one which is usually varied to obtain a desired result. If an analysis of the residue gas shows that it contains an appreciable quantity of gasoline the oil rate is increased to extract same. The pressure might have been increased or the temperature lowered to obtain the same result.

In the extraction of gasoline from natural gas, butane and propane are also extracted. On a basis of percentage extracted, there will be more pentane than butane, and more butane than propane; for all practical purposes the percentage extracted will be inversely as their vapor pressures. The percentage of these constituents extracted can be increased as stated above by increasing the absorption pressure, lowering the absorption temperature or increasing the oil rate.

The oil rate is usually expressed in gallons of oil contacted with a thousand cubic feet of inlet gas. In making calculations involving oil to gas ratios, the oil and gas are expressed in mols, and one mol. of light oil will absorb as much butane as one mol. of heavy oil. But a quantity of light or low molecular weight oil will contain more mols than an equal volume of heavy or high molecular weight oil. That is an important consideration in selecting an absorbent medium. By selecting the lightest practical oil, less gallons will have to be circulated, or with an equal quantity circulated more gasoline and/or lighter hydrocarbons can be extracted. However, if too light an absorbent oil is used relatively large quantities of it will be carried out of the absorber with the residue gas as a vapor and mist.

The absorption pressure will be the determining factor in selecting a light absorbent. Light gas oil having a molecular weight between one hundred seventy and two hundred fifty is practical for absorption pressures above twenty pounds gauge. Gasoline could be used as the absorbent oil in the extraction of butane and lighter hydrocarbons without losing much of the oil overhead with the residue gas if the absorber pressure were three hundred pounds or more and preferably above four hundred pounds.

Appreciable quantities of butane and propane are now being extracted in the process of extracting natural gasoline from gases, but their production cannot be materially increased by increasing the absorption pressure, lowering the absorption temperature, or increasing the oil rate without excessive cost which is prohibitive at the present price of gasoline.

It is a general object of my invention to provide a method for the extraction of volatile hydrocarbons such as butane, propane, etc. at a cost much lower than is now possible by the present methods.

One of the outstanding features of this invention is the multiple absorption system. The gas to be treated is passed through two or more scrubbers or absorbers and there are at least two absorbent menstrums used, one of which is lighter or more volatile than the other. The light aborbent is used to contact the gas in the first absorber, and the heavy absorbent is used in the final absorber to contact the gas which has been previously contacted with the light absorbent.

This process has many advantages over the present absorption processes, such as being able to use a light or low molecular weight absorbent without resorting to expensive high pressure equipment and without danger of losing the light absorbent overhead. If the gas did carry appreciable quantities into the second absorber the heavy absorbent oil would readily extract it from the gas, and it would be recovered and recirculated in the first absorber. The fact that one gallon of light absorbent such as natural gasoline is equivalent to about three gallons of gas oil in extracting butanes and lighter, means a big saving in equipment. When this process is used in conjunction with the extraction of natural gasoline a still larger saving can be effected, because the additional equipment required will be very little.

In the operation of my process, it will be noted that the gas to be processed is first contacted with a light absorbent, or one which is partially volatile under the conditions of contact. Since this contact will ordinarily be conducted by efficient counter-current procedure, the gas, as it leaves the first absorber will always be virtually saturated with the absorbent, and will carry a virtually constant quantity of absorbent regardless of the quantity of absorbent with which it was brought into contact. In other words, the carry-over of the light, partially volatile absorbent will be independent of the oil rate at which that absorbent is circulated.

I have found that the process can be operated for the most efficient extraction of the more volatile hydrocarbons by using relatively very high rates of circulation of light oil to the first absorber, and relatively low rates of circulation of the heavier substantially non-volatile oil to the second absorber. In general, these rates of oil circulation should be such that at least two, and preferably three or more gallons of the light absorbent will be circulated in the first absorption stage for each gallon of heavy oil circulated in the second absorption stage, and oil rates as high as five or ten times the rates used in the second absorption stage may advantageously be used in the first stage under some circumstances.

Highly effective stripping of the large quantities of light oil used in the first absorption stage will not, under all circumstances, be required. The rich oil may merely be "flashed" by reduction in pressure, or it may be stripped by countercurrent contact with gases remaining uncondensed in a later stage of the process. A small increment of heat may be imparted to it prior to stripping if desired, however.

The process may be used in conjunction with the extraction from gases of normally liquid constituents, such as natural gasoline, or it may be used to concentrate the heavier hydrocarbons contained in gases composed principally of normally gaseous constituents, as for example, the gas produced by the primary cracking of butane.

My process will be better understood by reference to the attached drawing, which is a diagrammatic representation of a plant suitable for its conduct. In this drawing, the gas to be processes is fed to the system through the line 1 into the absorber 2. In this it passes upwards, counter-current to the light absorbent, and passes through lines 3 and 4 into the absorber 5. In this absorber, any vaporized light absorbent present in the gas is recovered by contact with a heavy absorbent and the residue gas leaves the system through the line 6. A light absorbent, for example a hexane or heptane fraction from natural gasoline, is fed to the top of the absorber 2 by means of the pump 39 and the line 7. From the bottom of this absorber 2, the enriched absorbent passes through the line 8, and, if desired, the separator 9, into the line 10 leading to the strippers. From this line it passes through the line 11, and, if desired, through the heater 12 into the stripper 13. Here it is stripped of most of its lighter constituents, with the heavier ones passing out through the line 14 and the cooler 15 to the accumulator 16, from which the pump 39 takes suction.

The heavier, relatively non-volatile oil enters the top of the absorber 5 through the line 17. After being contacted with the gas, it is discharged through the line 18 and separator 19 into the line 20. This line conducts it through the conventional stripping steps, such as the heat exchanger 21, heater 22 and stripping column 23. From the base of the stripping column, the heavy oil passes to the heat exchanger 21, the cooler 36 and the accumulator 37 from which the pump 38 pumps it back through the line 17 for reuse.

The vapors from the stripper 23 pass through the line 24 and the trap 27 to the condensing coil 29, wherein they may be condensed together with vapors coming from the stripper 13 through the line 28. From the condenser 29 the mixture passes to the separator 30 where any liquid condensed is separated and removed from the system through line 34 and pump 35. The vapors from the separator 30 are further compressed in the compressor 31 and cooled in the condenser 32, from which they are passed to the separator 33 in which a separation of additional liquid takes place. The liquid products of this separation are added to the final product, while the vapors may if desired be returned through line 26 to the inlet of the system. Any accumulation of heavy products in the light absorbent may be prevented by occasionally passing some of the stripped light absorbent through the line 25 into the stripper 23.

Many minor modifications of the absorption system above described will immediately be apparent to those skilled in the art. However, the salient features, namely the use of a relatively light absorbent in the first absorber, an absorbent so light as to be even appreciably volatile or contain appreciable quantities of substances which are volatile under the conditions of contact with the gas, together with a relatively high oil circulation to the first absorber, as compared with the second absorber are the features essential to economical operation.

It will be evident that many minor changes in equipment and processing can be made without departing from the spirit of the invention. The term absorber is used to describe any device for the reasonably efficient counter-current contacting of liquids with vapors.

What I claim is:

1. The process of extracting volatile hydrocarbons from gases containing such hydrocarbons which comprises passing the gases successively through two absorbers, contacting them in the first absorber with an oil which is partly volatile under the conditions of contact, and in the second absorber with an oil which is substantially non-volatile under the conditions of contact, maintaining superatmospheric pressure in both absorbers, and circulating oil to both absorbers at such rates that at least twice as many gallons of oil are pumped to the said first as are pumped to the said second absorber.

2. The process of extracting volatile hydrocarbons from gases containing such hydrocarbons which comprises passing the gases successively through two absorbers, contacting them in the first absorber with an oil which is partly volatile under the conditions of contact, and in the second absorber with an oil which is substantially non-volatile under the conditions of contact, maintaining superatmospheric pressure in both absorbers, and circulating oil to both absorbers at such rates that at least twice as many gallons of oil are pumped to the said first as are pumped to the said second absorber, and separately removing light hydrocarbons extracted from the gas from each of the oils being circulated to the two absorbers.

3. The process of extracting volatile hydrocarbons from gases containing such hydrocarbons, which comprises passing the gases successively through two absorbers, contacting said gases in the first absorber with an oil which is partly volatile under the conditions of contact and in the second absorber with an oil which is substantially non-volatile under the conditions of contact and maintaining superatmospheric pressure in both absorbers, circulating oil to both absorbers at such rates that at least twice as many gallons of oil are pumped to the said first absorber as are pumped to the said second absorber, withdrawing the oil from said absorbers and separately treating said oils to extract therefrom light hydrocarbons, and recirculating the oil back to the respective absorbers.

4. The process of extracting desirable volatile hydrocarbons from gases containing such hydrocarbons, which comprises passing the gases successively through two absorbers, contacting them in the first absorber with an oil which is partly volatile under the conditions of contact and in the second absorber with an oil which is substantially non-volatile under the conditions of contact while maintaining superatmospheric pressure in both absorbers, withdrawing oil from said first and second absorbers and removing therefrom by independent operations said desirable volatile hydrocarbons, returning the denuded oil from said first and second absorbers back to the respective absorbers from which it was withdrawn, and circulating oil to both absorbers at such rates that at least twice as many gallons of oil are pumped to said first absorber as are pumped to said second absorber.

5. The process of extracting desirable volatile hydrocarbons from gases containing such hydrocarbons, which comprises passing a stream of gases through a first absorption step and contacting said gases in said first absorption step with an oil absorption medium which is partly volatile under the conditions of said contact and thereby removing from said stream of gases desirable volatile hydrocarbons, passing the remainder of said stream of gases through second absorption step and contacting the remainder of said stream of gases in said second absorption step with an oil absorption medium which is substantially non-volatile under conditions of said contact, withdrawing the oil absorption medium from said first oil absorption step and removing the desirable volatile hydrocarbons therefrom and circulating the denuded oil absorption medium back to said first oil absorption step, and withdrawing the oil absorption medium from said second oil absorption step and removing the desirable volatile hydrocarbons therefrom and circulating the denuded oil absorption medium back to said second oil absorption step at a rate materially in excess of that used to circulate the oil absorption medium back to said first oil absorption step.

HARRY E. DRENNAN.